United States Patent [19]

Hindman, Jr.

[11] 4,185,380

[45] Jan. 29, 1980

[54] FLEXIBLE LINE ROTARY VEGETATION CUTTER HAVING A TENSION REGULATED LINE FEED

[76] Inventor: Jack W. Hindman, Jr., P.O. Box 2335, Lincoln City, Oreg. 97367

[21] Appl. No.: 857,598

[22] Filed: Dec. 5, 1977

[51] Int. Cl.$^2$ ............................................. A01D 55/18
[52] U.S. Cl. ...................................... 30/347; 56/12.7
[58] Field of Search ................... 30/276, 347; 56/12.7, 56/295

[56] References Cited

U.S. PATENT DOCUMENTS 3,826,068  7/1974  Ballas et al. ........................... 56/12.7

FOREIGN PATENT DOCUMENTS 6938265  10/1969  Fed. Rep. of Germany ............ 56/12.7

Primary Examiner—Jimmy C. Peters
Attorney, Agent, or Firm—Chernoff & Vilhauer

[57] ABSTRACT

Rotary Vegetation Cutter is comprised of a housing, which is arranged for rotation about a central axis, having a plurality of cylindrical reel receiving cavities located in it with a line supply aperture passing between each cavity and the periphery of the housing. A supply reel is rotatably located in each cavity and a flexible non-metallic line has an inner portion which is wound around the reel and an outer portion which passes through the associated aperture and extends outwardly of the periphery of the housing. Wedge-shaped teeth located on one face of the reel are urged into engagement with like configured notches located in the cavity by a spring element, which is integral with the other face of the reel, to prevent rotation of the reel due to the centrifugal force on the line when the housing is rotated. However, when the operator pulls on a line, sufficient force is generated to cause the teeth to ride up on the notches and to compress the spring, thereby allowing the reel to be rotated and feed out more line. Accordingly, as a line becomes worn or broken it can be renewed merely by pulling on it.

3 Claims, 5 Drawing Figures

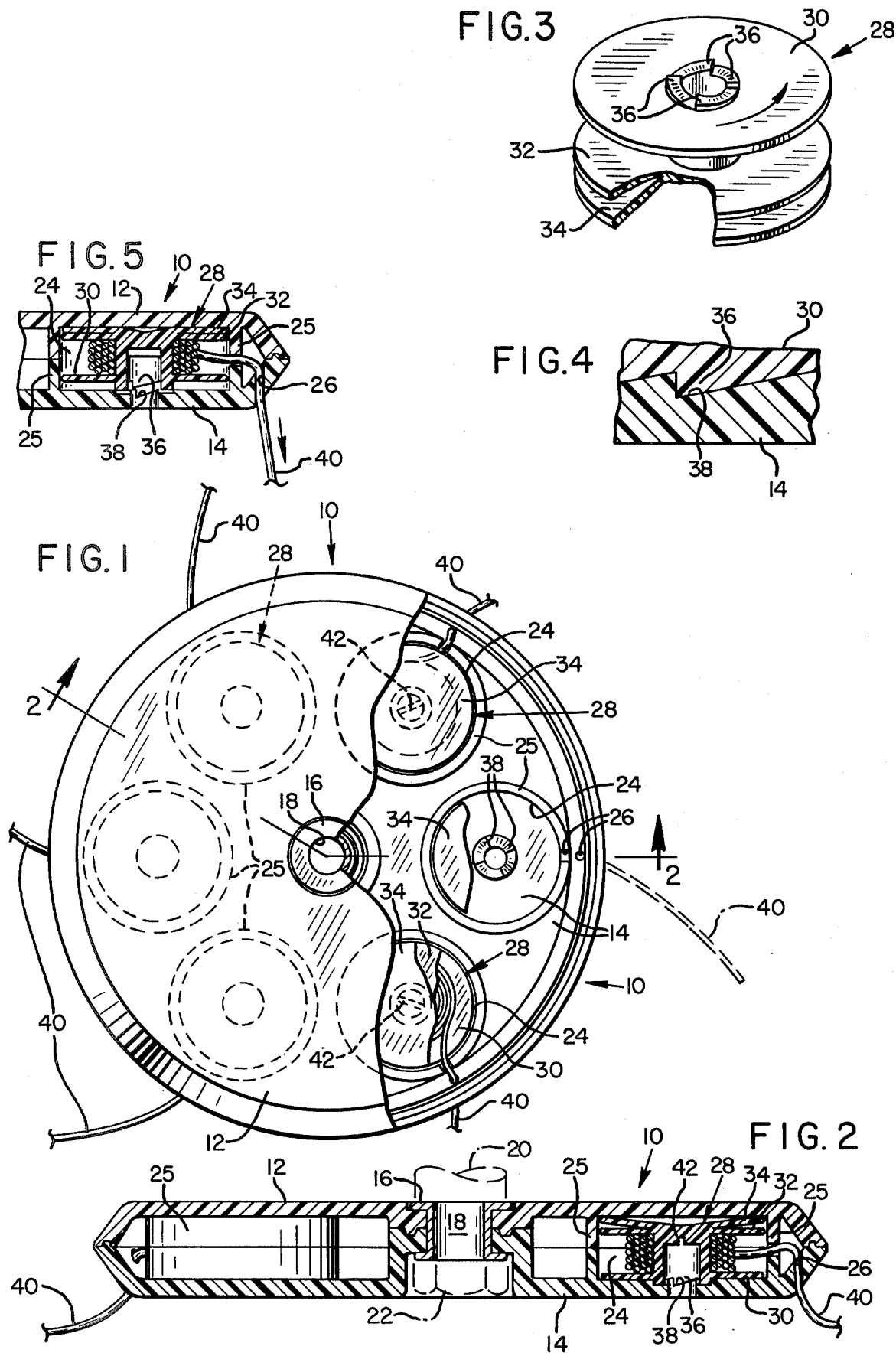

FLEXIBLE LINE ROTARY VEGETATION CUTTER HAVING A TENSION REGULATED LINE FEED

BACKGROUND OF THE INVENTION

Cutters having rotatable housings provided with one or more non-metallic flexible lines which extend outwardly therefrom, have become common for cutting or trimming vegetation. Devices of this class are shown for example in Geist et al, U.S. Pat. No. 3,708,967, Ballas et al, U.S. Pat. No. 3,826,068 and Ballas et al, U.S. Pat. No. 3,859,776.

In Ballas 776 the line is wrapped around a central drum by manually unwinding it. In Geist and Ballas 068 the lines are individually carried on a plurality of spools, and each spool is displacable to a position where it is rotatable for unspooling line. While either of these procedures is acceptable in a lightweight trimmer or edger of the type that is shown in these references, it is not acceptable in a heavy device such as a lawnmower where the cutter is not easily accesible without lifting or tipping of the mower. While a user's hand can be placed under a lawnmower to reach the line, the user has no visual contact with his hand and thus unwrapping or deflection of a spool is difficult to accomplish.

SUMMARY OF THE INVENTION

A rotary vegetation cutter comprises a two-piece housing which is joined together by a central rivet having a bore therein which is arranged for being received on the shaft of a power lawnmower. Reel receiving cavities positioned at spaced radial locations in the housing are arranged to rotatably receive supply reels onto which one of the ends of flexible non-metallic lines are wound, with the opposite ends of the lines passing through apetures in the housing to extend outwardly therefrom.

The reels have wedge-shaped teeth on one of their sides which interfit with like configured notches that are located in the cavities. The teeth are normally urged into contact with the notches by spring elements located on the other faces of the reels, with the springs exerting enough force on the teeth so that the reels are restrained from being rotated by the centrifugal force created on the lines when the housing is rotated.

However, when the operator pulls on one of the lines, sufficient force is applied to the associated reel so that its teeth ride up on the notches and compress the spring, thereby permitting that reel to rotate and feed out more line. Therefore, as a line becomes shorter due to wear or breakage, it can be lengthened merely by pulling additional line off of the reel.

In addition, a slot is located on each reel on the side having the teeth, and an aligned opening is located in the housing so that a tool, such as a screwdriver, can be inserted into the slot, pushed inwardly to disengage the teeth from the notches and then rotated. Accordingly the line also can be shortened if necessary.

It is a principal objective of the present invention to provide a rotary vegetation cutter having a tension regulated line feed.

It is a further object of the present invention to provide such a rotary vegetation cutter wherein the line is fed merely by pulling on it.

It is a still further object of the present invention to provide such a rotary vegetation cutter which is of simplified design for inexpensive manufacture.

The foregoing objects, features and advantages of the present invention will be more readily understood upon consideration of the following detailed description of the invention taken in conjunction with the accompanying drawings.

BRIEF DESCRIPTION OF THE DRAWINGS

FIG. 1 is a plan view, partially broken away to show hidden detail, showing a preferred embodiment of the apparatus of the present invention.

FIG. 2 is a sectional view taken on the Line 2—2 of FIG. 1.

FIG. 3 is a pictorial view, partially broken away, showing one of the reels which is a feature of the invention.

FIG. 4 is a fragmentary sectional view showing a detail of the reel of FIG. 3.

FIG. 5 is a fragmentary sectional view, similar to that of FIG. 2 showing the reel displaced to a position wherein it is rotatable.

DESCRIPTION OF THE PREFERRED EMBODIMENT

Referring to FIGS. 1 and 2 of the drawings, the present invention comprises a housing 10 which is rotatable about a central axis. The housing is shown as being formed from a top element 12 and a bottom element 14 which are joined together by a rivet 16 having a bore 18 which is coaxial with the central axis. Accordingly, the housing can be attached to the drive shaft 20 of a lawnmower by means of a nut 22.

Located in the housing at spaced angular locations about the central axis are a plurality of reel receiving cavities 24, which are shown as being defined by cylindrical shells 25. A line supply aperture 26 extends through each shell 25 and housing 10 between each cavity and the periphery of the housing.

Rotatably contained within each cavity 24 is a supply reel 28, FIG. 3, which comprises a spool having a planar face 30 on one side. The face on the other side of the reel is bifurcated into a planar inner element 32 and an outwardly angled outer element 34 which is joined to inner element 32 at their center, and which is separated from it at their periphery. The outer element is flexible so that it can be deflected inwardly towards the inner element by the application of force to it. Accordingly, the outer element serves as a spring as will be more fully explained later.

Located on the inner face of each reel are a plurality of sloped outwardly facing wedge-shaped teeth 36 which mate with similarly shaped notches 38 formed in the bottom of cavity 24, FIG. 4. The reel and cavity are arranged so that when teeth 36 are located in notches 38, outer element 34 of the reel is slightly compressed by the top of the cavity as shown in FIG. 2. Thus the teeth are positively urged into the notches and rotation of the reel is restrained.

Flexible non-metallic lines 40, such as lengths of monofilament fishing line, have inner portions which are wrapped around their respective reels 28, and outer portions which pass through apertures 26 and extend outwardly of the periphery of the housing. Thus when the housing is rotated with shaft 20, the outer portions of the lines are radially straightened by centrifugal force and will cut vegetation in the manner of prior art cutters. When this occurs the reels 28 are restrained against rotating in cavity 24 by the interaction of teeth 36 and notches 38 due to the downward force created by the partially compressed outer elements 34.

However, if a greater amount of force is applied to a line 40, such as its being pulled by an operator, teeth 36 on the associated reel are raised on notches 38 as outer element 34 is compressed, as is shown in FIG. 5, and the reel is rotated to feed out more line. When the force is released the teeth once more will be seated in the notches as the centrifugal force on the line due to the rotation of the housing is inadequate to maintain the deflection of the outer element. Accordingly, when a line becomes too short for efficient cutting due to wear or breaking, the operator can renew it to the desired length merely by pulling on it.

The reels also each contain a central slot 42, FIG. 2, which faces towards the ratchet teeth, and the housing contains openings 44 which are located opposite each slot, so that a tool, such as a screwdriver (not shown), can be inserted into a slot to force the teeth out of the notches and rotate the reel so that the line can be rewound onto it when desired.

The terms and expressions which have been employed in the foregoing abstract and specification are used therein as terms of description and not of limitation and there is no intention, in the use of such terms and expressions, of excluding equivalents of the features shown and described or portions thereof, it being recognized that the scope of the invention is defined and limited only by the claims which follow.

What is claimed is:

1. A flexible line rotary vegetation cutter having a tension regulated line feed comprising:
   (a) a housing having at least one reel receiving cavity located therein and rotatable about a central axis;
   (b) said housing having a line supply aperture associated with each reel receiving cavity, opening between its respective cavity and the periphery of said housing;
   (c) a supply reel including a spool having paired, spaced-apart parallel faces, located in each cavity in a manner for free, supported rotation therein;
   (d) a flexible non-metallic line associated with each supply reel, having an inner portion wrapped about its respective supply reel and an outer portion passing through the associated line supply apperture and extending outwardly of the periphery of said housing;
   (e) engagement means associated with each supply reel for preventing rotation of said supply wheel in said cavity unless a manual, external, radially outward force is exerted on said line which is greater than the centrifugal force created on said line when said housing is rotated about said central axis;
   (f) wherein said engagement means comprises; teeth located on one of said faces, notches located in said cavity in a manner to engage said teeth when said supply reel is positioned in said cavity and urged toward said notches so as to resist rotation of said supply wheel in said cavity, spring biasing means associated with the other face of said supply reel for normally urging said teeth toward said notches, and said teeth and said notches including mating ramps so that forced rotation of said supply reel causes said teeth to be raised with respect to said notches by compressing said spring biasing means.

2. The cutter of claim 1 wherein said spring biasing means comprises said other face of said reel being bifurcated into an inner element and an outer element, said outer element being flexible and being angled radially outwardly from said inner element.

3. The cutter of claim 1 wherein said supply reel contains a slot on the face containing said teeth, and said housing defines openings adjacent to each said slot arranged for inserting a tool into engagement with said slot in a manner to urge said teeth out of said notches and thereafter rotate said supply wheel to rewind said line thereon.

* * * * *